United States Patent [19]

Geerlings et al.

[11] Patent Number: 5,511,319
[45] Date of Patent: Apr. 30, 1996

[54] VEHICLE COMPASS CORRECTION CIRCUIT

[75] Inventors: Steven L. Geerlings, Zeeland; Mark J. Bussis, Hudsonville, both of Mich.

[73] Assignee: Prince Corporation, Holland, Mich.

[21] Appl. No.: 297,699

[22] Filed: Aug. 29, 1994

[51] Int. Cl.$^6$ .................................................. G01C 17/38
[52] U.S. Cl. ............................................. 33/356; 33/355 R
[58] Field of Search ........................ 33/356, 357, 361, 33/355 R; 364/559, 571.01, 571.02, 571.04, 571.05

[56] References Cited

U.S. PATENT DOCUMENTS

| | | | |
|---|---|---|---|
| 4,091,543 | 5/1978 | Lapeyre | 33/356 |
| 4,341,023 | 7/1982 | Marcus et al. | 33/349 |
| 4,414,753 | 11/1983 | Moulin et al. | 33/357 |
| 4,424,631 | 1/1984 | Franks | 33/361 |
| 4,425,717 | 1/1984 | Marcus | 33/361 |
| 4,505,054 | 3/1985 | Clark et al. | 33/357 |
| 4,546,551 | 10/1985 | Franks | 33/356 |
| 4,622,754 | 11/1986 | Chujo et al. | 33/356 |
| 4,672,565 | 6/1987 | Kuno et al. | 33/357 |
| 4,677,381 | 6/1987 | Geerlings | 33/361 |
| 4,953,305 | 9/1990 | Van Lente et al. | 33/356 |
| 5,287,297 | 2/1994 | Ihara et al. | 33/356 |

*Primary Examiner*—William A. Cuchlinski, Jr.
*Assistant Examiner*—G. Bradley Bennett
*Attorney, Agent, or Firm*—Price, Heneveld, Cooper, DeWitt & Litton

[57] ABSTRACT

A compass circuit has a magnetic field sensor adapted to be positioned in a vehicle near a source of varying magnetic fields. A source of correction signals is coupled to the compass circuit for providing correction signals applied to the compass circuit for correcting the heading display of the compass circuit when differing levels of magnetic field disturbance occurs to provide accurate heading information. In a preferred embodiment the source of correction signals includes a detector circuit coupled to the vehicle accessory for providing signals directly corresponding to the source of magnetic field interference.

23 Claims, 3 Drawing Sheets

5,511,319

VEHICLE COMPASS CORRECTION CIRCUIT

BACKGROUND OF THE INVENTION

The present invention relates to magnetic direction sensing systems and particularly those for use in vehicles.

U.S. Pat. No. 4,953,305 discloses an electrical compass system for use in a vehicle in which a magnetic sensor, such as a flux-gate sensor, is employed in connection with a microprocessor to provide a digital display of the vehicle heading. The system described in the '305 patent provides continuous automatic calibration of the compass to correct for changes in the detected magnetic field due to the vehicle's magnetism and changes thereto as well as provides a system which, in effect, filters out magnetic aberrations caused by travel within an area where severe electromagnetic interference may temporarily occur.

The magnetic sensors are optimally located in the upper windshield area of a vehicle, preferably near the vehicle roof and remote from large current carrying conductors in the vehicle's electrical system which may otherwise cause magnetic disturbance which adversely affects compass operation. One system incorporated a sensor located in their rear package tray area of the vehicle and operation of the rear window defroster which draws significant current caused undesirable interference with the compass operation. To correct for this condition which occurs only on an infrequent basis, the compass included a sensing input for determining when the rear window defroster was on and provided a correction signal to the compass microprocessor to cancel out the magnetic field disturbance caused by operation of the rear window defroster. It is preferable however to mount the magnetic field sensor in areas remote from such electrical disturbance as, for example, taught in U.S. Pat. No. 4,505,054. Vehicle design however, does not always accommodate such a mounting system. In view of the desirability of mounting the magnetic sensor on a circuit board which includes the remaining compass elements, if it is desired to have the compass display in, for example, the instrument panel, the sensor mounted on the board with the display must of necessity also be mounted in the instrument panel.

The instrument panel area of a vehicle is generally considered an unsuitable environment for an electronic compass sensor and has heretofore been avoided. It has been discovered, for example, that current through the fan motor for the vehicle's HVAC system can vary the ambient magnetic field from 10 to 40 milligauss for each of the detection axes of the compass sensor as a function of the fan speed setting. As can be appreciated with a higher fan speed, a higher magnitude of DC magnetic field disturbance is introduced in the area of the sensor if mounted in the instrument panel area adjacent a conductor supplying current to the fan motor.

SUMMARY OF THE PRESENT INVENTION

In order to accommodate modern vehicle design and allow the installation of an electronic compass in the instrument panel, the system of the present invention provides a source of multiple level correction signals which vary in response to changes in the fan motor speed settings or other high current electrical operating devices which may interfere with compass operation. These correction signals are selectively applied to the compass circuit for compensating for the magnetic field disturbance which may temporarily occur and which may vary during such occurrence in magnitude. Thus, the system of the present invention provides dynamic correction signals for varying levels of temporary magnetic field interference caused by operation of vehicle accessories such as the fan motor.

Circuits embodying the present invention include a compass circuit having a magnetic field sensor adapted to be positioned in a vehicle near a source of varying magnetic fields and a source of correction signals coupled to the compass circuit for providing correction signals applied to the compass circuit for correcting the heading display of the compass circuit when differing levels of magnetic field disturbance occur to provide accurate heading information. In a preferred embodiment of the invention a source of correction signals includes a detector circuit coupled to the vehicle accessory for providing signals directly corresponding to the source of magnetic field interference. By providing correction signals which correspond to varying levels of disturbance caused by vehicle accessory operation, the vehicle designer is freed from the constraints of the preferred mounting of a compass sensor in a location with minimum field disturbance and is free therefore to provide mounting locations for the electronic compass in the vehicle environment. These and other features, objects and advantages of the present invention will become apparent upon reading the following description thereof together with reference to the accompanying drawings in which:

DETAILED DESCRIPTION OF THE PREFERRED EMBODIMENT

Figure 1:
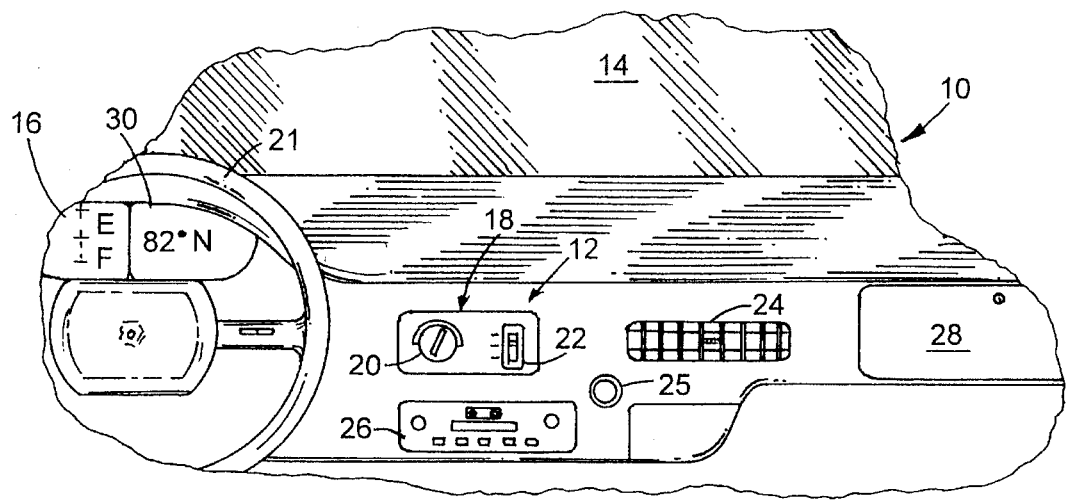
FIG. 1 is a fragmentary perspective view of a vehicle instrument panel showing the electrical compass of the present invention installed therein.

Referring initially to FIG. 1 there is shown a vehicle 10 such as an automobile and the front area including the instrument panel 12 located below the front windshield 14. The vehicle includes an instrument display 16 for a variety of vehicle functions such as speed, oil pressure, fuel, battery condition and the like. Located in the instrument panel 12 also is a temperature control system 18 which may include a temperature setting control 20 and a fan speed control switch 22. In the instrument panel also is an electronic compass 30 embodying the present invention which is preferably located adjacent or integrated into the vehicle's instrument display 16 although compass 30 can be located anywhere in the instrument panel as desired.

The instrument panel will typically include one or more ventilator outputs 24 for the HVAC system as well as a audio system 26 and other vehicle accessories. The vehicle instrument panel 12 may also include a glove box 28 which is selectively illuminated when opened and may also provide a source of interfering magnetic field as might the vehicle's cigarette lighter 25.

Although the compass 30 with its integrated circuit board and sensor may be positioned physically apart from the controls for example the fan speed control switch 22, the cigarette lighter 25 or other instrument panel mounted controls which control accessories which utilize significant current, the conductors for such control switches and accessories typically run in a bundle which extends through the fire wall adjacent the steering column and the dashboard display area above the steering wheel 21. Also, the compass 30 can be positioned in an area immediately adjacent such controls and their current carrying conductors. As a result, operation of, for example, the fan speed switch 22 between off and high position can provide a change in the magnetic field disturbance in the order of 40 milligauss in varying degrees. Depending on the setting of the fan speed control switch therefore a magnetic field sensor associated with the compass 30 will detect an erroneous magnetic field for a period of time until the automatic compensation correction circuit of the system of the prior art will eventually correct for the magnetic field disturbance. By this time however the fan speed may have again changed and the compass again would provide an erroneous heading display. Accordingly, with dynamically varying and what might be frequently occurring changes in the vehicle's system due to operation of vehicle accessories intermittently, the correction circuit of the present invention is employed.

Figure 2:
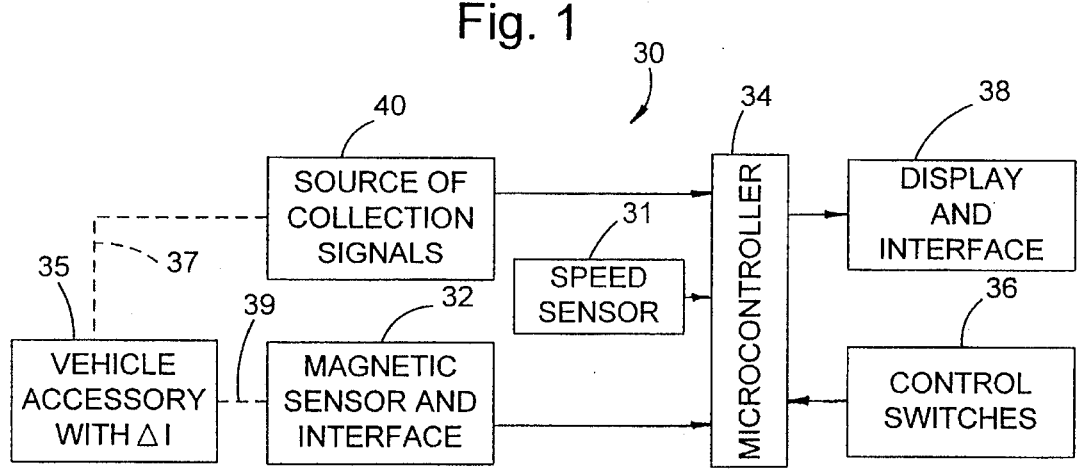
FIG. 2 is an electrical circuit diagram in block form of the system of the present invention.

Turning now to FIG. 2 there is shown a block electrical diagram of the compass 30 which can generally be of the type disclosed in U.S. Pat. No. 4,953,305 issued Sep. 4, 1990 to Van Lente et al., the disclosure of which is incorporated herein by reference. The compass includes a magnetic sensor and associated interface circuits 32 coupling the sensor to a microcontroller 34. The magnetic sensor can be a flux-gate type sensor, a magnetoinductive sensor, a magnetoresistive sensor, or other device which can sense the earth's magnetic field and provide signals representative thereof to the microcontroller 34. The sensor selected will require signal conditioning to provide a signal format to the microcontroller data input in a conventional manner known to those skilled in the art. The microcontroller in the preferred embodiment of the invention was a 6805 Motorola microcontroller B-6 version which includes on-board memory and A to D converters and which is programmed to provide automatic compensation and variation correction as disclosed in U.S. Pat. No. 4,953,305. The microcontroller receives control input signals from a plurality of switches indicated by block 36 which may, for example, include compass on-off control, a display control switch for english or metric display of the temperature information also associated with the compass, or variation correction input information. The microcontroller 34 is coupled to an interface and display 38 which can be coordinated with the instrument panel display 16 and comprise a vacuum fluorescent, LCD, or other conventional electronic display in common use in the vehicle environment. A conventional electronic speed sensor 31 is coupled to the input of the microcontroller and signal information therefrom is employed as described below in connection with the FIG. 5 description of operation.

Coupled also to a data input of the microcontroller 34 and in the preferred embodiment to pin 5 of the particular microcontroller utilized, is the source of correction signals 40 which provides the microcontroller information corresponding to the magnitude and direction of magnetic field disturbance caused by the operation of interfering accessories. For such purpose, the source of correction signals 40 may be coupled directly to a vehicle accessory with chang-ing current as illustrated by block 35 in FIG. 2 as represented by the dashed lines 37. The vehicle accessory with interfering magnetic fields is positioned or has current supplying conductors sufficiently close to the magnetic sensor 32 as indicated by dashed lines 39 so as to cause an erroneous direction display at least temporarily due to the interfering magnetic field. Thus, line 39 in FIG. 2 represents the proximity of the interfering field to the magnetic sensor 32.

The source of correction signals 40 may be coupled directly to the vehicle accessory as in the preferred embodiment of the invention or be an electrical model of accessory operation which provides control signals by, for example, predicting that for a given climate control temperature setting, the fan speed will initially be high until the desired temperature is gradually reached after which time the fan speed will be lowered. In the preferred embodiment however, the source of correction signals is coupled directly to the vehicle accessory as now described in connection with FIG. 3.

Figure 3:
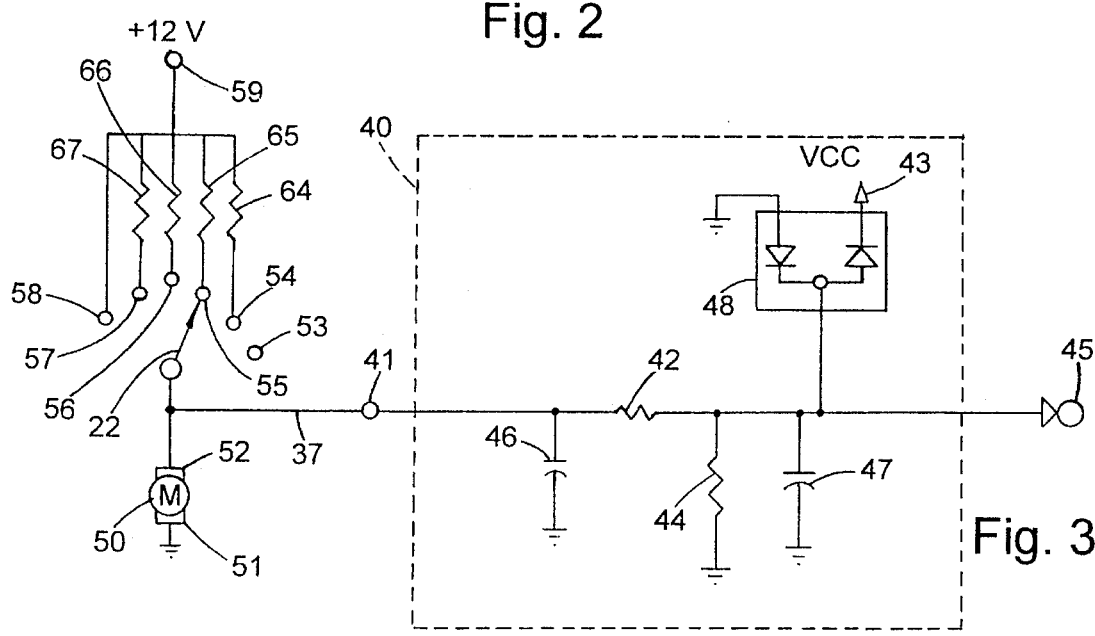
FIG. 3 is an electrical circuit diagram in schematic form of a portion of the circuit shown in FIG. 2.

FIG. 3 shows only that portion of the compass circuit 30 relevant to a full understanding of the present invention including the source of correction signals 40 and the fan speed control switch 22. In FIG. 3, the vehicle accessory which causes the electrical disturbance is the motor 50 for the vehicle's HVAC system which has one terminal 51 coupled to system ground and a second terminal 52 coupled to the fan speed control switch 22 which may include up to five or more positions including an off position 53 and a maximum on position 58. Each of the switch terminals 54–58 are coupled to contact terminal 59 in turn coupled to the vehicle's battery through associated current limiting resistors 64–67. Resistors 64–67 vary in resistance value to vary the current flowing through motor 50 thereby causing different DC magnetic fields surrounding the conductors coupling the motor to the switch 22 and providing a temporary and varying magnetic disturbance to the magnetic sensor 32 of the compass circuit 30. As can be appreciated with switch 22 in position 58, the maximum current flows through the motor for high speed operation thereby providing the highest degree of interference and when in the off position at terminal 53 no current flows through the motor thereby introducing no interfering fields. Although the compensation system described in the '305 patent will compensate for a steady state DC magnetic field as the car travels through a complete loop of travel, the compensation circuits of the past are designed primarily to provide for long-term steady state changes in the magnetic characteristics of the vehicle as opposed to dynamically changing intermittent magnetic field disturbances. In order to provide correction signals to the microcontroller 34, the source of correction signals 40 is employed and comprises a circuit for detecting the actual voltage applied to the fan motor 50 and applying such signals after conditioning directly to the microcontroller which is programmed to generate compensating signals for correcting for the temporary magnetic field disturbance as required and as described in connection with the programming flow diagram of FIG. 4 described below.

Circuit 40 includes an input terminal 41 coupled to the terminal 52 of fan motor 50 by conductor 37. The input signal can be as high as 12 volts and since the microcontroller operates on a maximum 5.5 volt DC signal level, the input signal applied to terminal 41 is applied to a voltage divider circuit comprising a first resistor 42 and a second resistor 44. The divider network is coupled between input terminal 41 and output terminal 45 of circuit 40 which is coupled in the preferred embodiment to pin 5 constituting the PD5/AN6 input terminal for the 6805 microcontroller employed. Resistor 42 comprises a 20 K Ohm resistor while resistor 44 comprises a 10 K Ohm resistor thereby providing one-third of the input voltage from terminal 41 to output terminal 45. A filtering capacitor 46 is also coupled to input terminal 41 to ground to suppress spikes or other interference which may occur on input conductor 37. A second capacitor 47 is coupled to output terminal 45 to ground and provides, together with input resistor 42, an integrator for providing a DC output signal at terminal 45 representing the divided voltage applied to input terminal 37 from the control voltage applied to fan motor 50.

A clamping circuit 48 comprising a pair of diodes with one diode having its anode coupled to ground and its cathode coupled to the junction of resistor 44 with capacitor 47 and a second diode having its anode coupled to the same junction and its cathode coupled to the +VCC supply 43 clamps the voltage level at output terminal 45 between −0.6 volts DC to +5.6 volts DC thereby preventing an over voltage signal from being applied to the input terminal of the microcontroller 34.

Thus, for example, with the fan switch 22 in its maximum on position coupling the fan motor terminal 52 to switch terminal 58, a 12 volt signal is applied to input terminal 41 which is integrated and divided to a lower level signal applied to output terminal 45 which is applied to the analog input terminal 5 of the microcontroller. The microcontroller receives this signal information and responds as described below in connection with the flow diagram to provide compensation correction for the level of magnetic field disturbance empirically determined to result in a vehicle at the high fan speed switch position to correct for the magnetic disturbance caused by the fan motor current. Similarly, when the switch 22 is positioned in the remaining lower speeds or off positions, the signal output at terminal 45 will be lowered until it reaches a steady state DC at which time no additional correction occurs. At intermediate fan speeds, varying levels of fan speed indicative signals will be applied to the output terminal 45 and to the input terminal the microcontroller 34 and the compensation correction adjusted accordingly to provide an accurate magnetic heading display for the vehicle compass 30 regardless of the operation of the fan motor. Other accessories such as the cigarette lighter, glove box or floor lamps under the instrument panel or any other temporarily actuated accessory which may provide intermediate interfering magnetic field disturbances may also be coupled to identical circuits 40 or modifications thereof for providing field disturbance identifying signals to the microcontroller for correcting the displayed magnetic heading. The microcontroller 34 is programmed in the same manner as disclosed in the above identified U.S. Pat. No. 4,935,305 to provide for compensation and variation correction and for preventing external field disturbances from affecting the compass display. The program is modified to incorporate the correction system of this invention as now described in connection with the flow diagram of FIG. 4.

Figure 4:
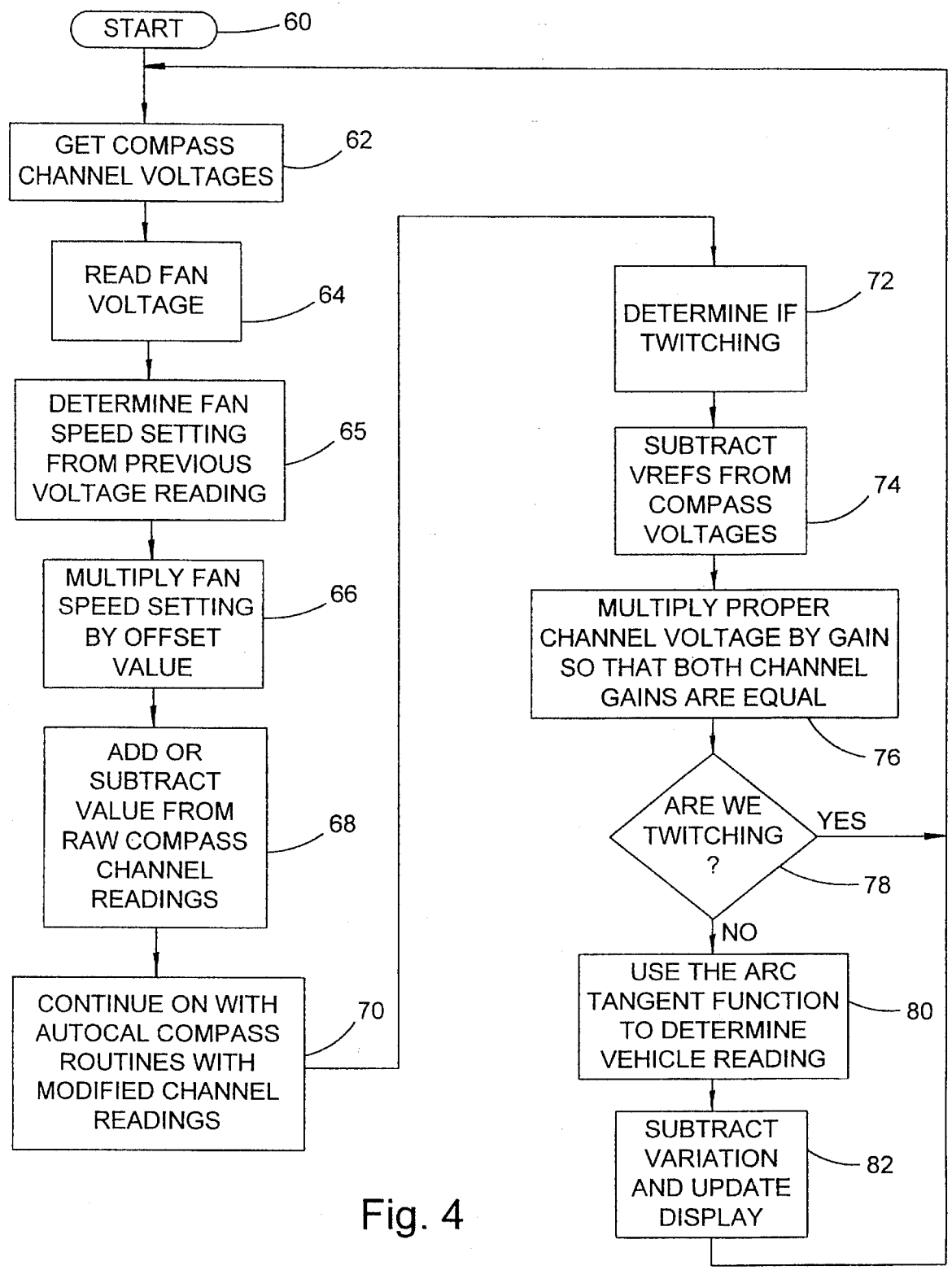
FIG. 4 is a flow diagram of the programming of the microcontroller to provide dynamic variable correction according to the present invention.

FIG. 4 shows the main program for the microcontroller 34. Upon initialization as indicated by block 60, the program obtains the signals from the magnetic sensor as indicated by block 62. Thus the signal output voltages on the two channels of signals from the X and Y axes of the magnetic field sensor are read and the program then reads the fan signal information at the output terminal 45 of the source of correction signals 40 which is inputted to the microcontroller as indicated by block 64. The voltage corresponds to a particular fan speed which has been previously determined by measuring the voltage at terminal 45 for the different fan speed settings and stored in memory as indicated by block 65.

Next, a compass heading correction signal for each channel of the sensor is generated as indicated by block 66 by multiplying the fan speed setting by an offset voltage which, in the embodiment of FIG. 4, is empirically determined by adjusting the correction voltage until the vehicle heading has not changed for the different directions of orientation of the vehicle with different fan speeds. Thus, for a given vehicle design, changing of the fan speed switch 22 will cause varying degrees of interference however such interference for a given vehicle type the wiring location will be substantially the same from vehicle to vehicle. For each vehicle type, the necessary offset is measured for each fan speed position and the correction voltage determined empirically by applying measured correction signals to the sensor output signals until the sensor output voltage reads the same as it would have without the field interference caused by the fan speed motor. The offset voltage is then added or subtracted from the actual compass sensor output voltage as indicated by block 68 and the program continues as indicated by block 70 with the automatic calibration routines as described in detail in the above identified '305 patent. These steps include the additional test block 72 to determine if any external magnetic field disturbances such as caused by a passing under power lines or over bridges is occurring and the normal calibration sub-routine entering the main program from arrow A as shown in FIG. 4. The determined reference voltages are subtracted from the detected voltages as indicated by block 74 which includes the correction signal from the normal compensation as well as the fan speed detection correction circuit 40.

Next, the program must assure that the gain for each the X and Y channels of the compass sensor are equal as indicated by block 76 and determine whether or not, due to external magnetic field interference, twitching has occurred as determined by block 78. If a rapidly changing magnetic field disturbance is occurring, the program returns to input of block 62 maintaining the compass heading display at the direction displayed prior to the existence of an external magnetic field disturbance. If no such external field disturbance is detected, the compass heading is determined through the conventional arc tangent function as indicated by block 80 to provide display signal information signals from the raw data and the variation from true north information is factored into the displayed output control signals as indicated by block 82 and the display is updated with such final signal information.

Figure 5:
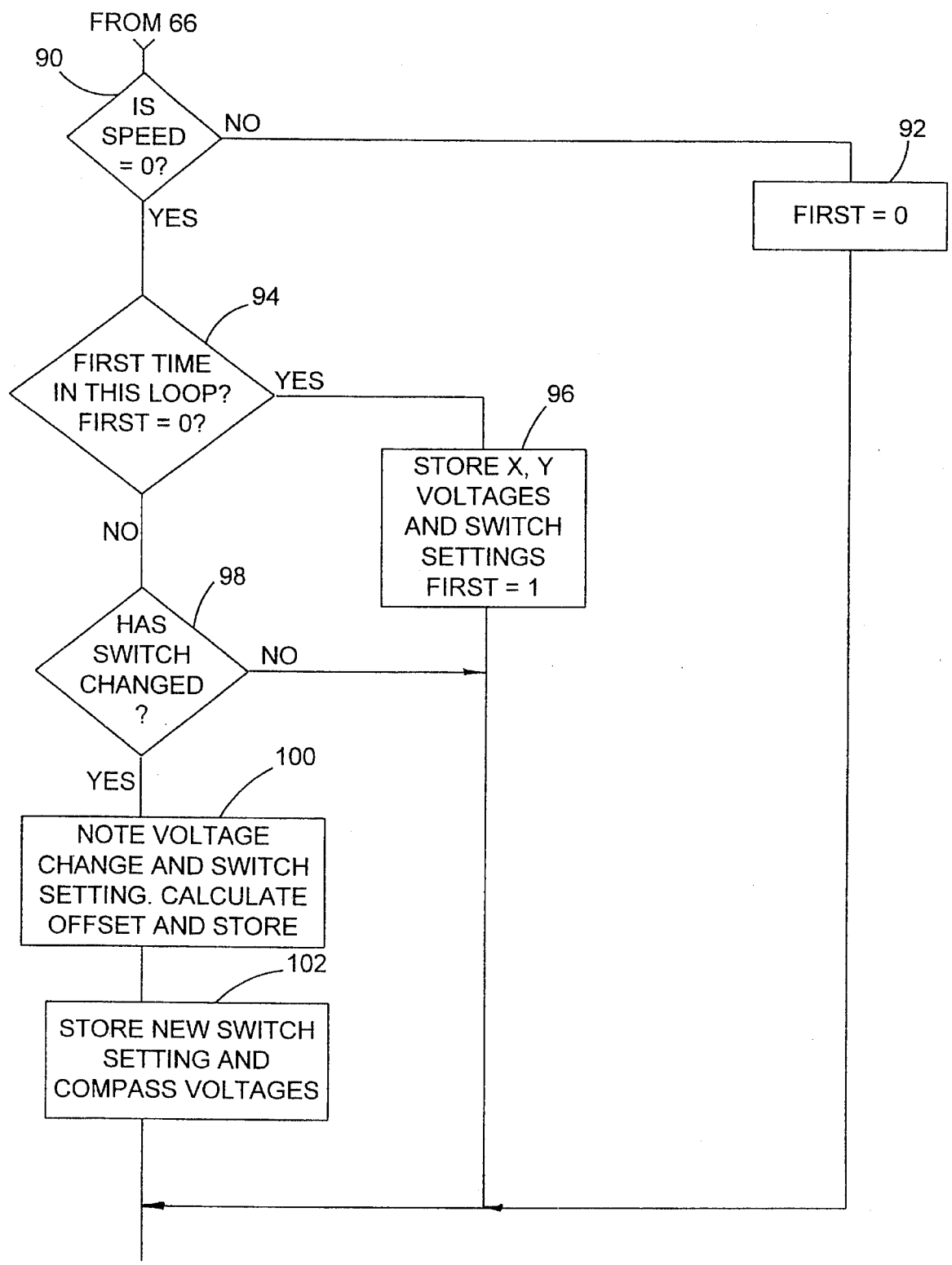
FIG. 5 is a flow diagram of the programming of the microcontroller according to another embodiment of the invention.

Instead of empirically determining the voltage offset for each of the fan speed settings as described above, the offset voltages required to correct for dynamic magnetic field interference caused by different fan speed motor settings can be accomplished automatically by the programming of the microcontroller according to the flow diagram of FIG. 5. This programming and testing is incorporated in the flow diagram of FIG. 4 at block 66 in this embodiment of the invention.

Referring now to FIG. 5, the microcontroller looks at signals from the electrical speedometer 31 (FIG. 2) employed with the vehicle and tests to determine whether the vehicle speed is zero miles per hour as indicated by block 90. This is desirable inasmuch as if the vehicle is in motion and perhaps changing directions, the change in field detected by the magnetic field sensor can be due to the change of the vehicle orientation as well as changes in the fan speed. Thus, it is desired to determine the correction offset voltages when the car is at rest. If the vehicle speed is not zero, the program proceeds to block 92 setting a flag for the variable FIRST equals zero and loops through the main program of FIG. 4.

The program continues successively through the loop until such time as the vehicle speed is zero at which time the program tests, as indicated by block 94, whether or not this is the first time the speed has been zero when the flag at 92 has been set. If it is, the program proceeds to block 96 and stores the X-axis and Y-axis signal inputs from the magnetic field sensor and assigns the switch setting to its corresponding position. The variable FIRST is then set to "1". The program then cycles through the loop again and at test block 94 will proceed through the "no" decision to block 98 which tests the fan speed switch, through the signal input from circuit 40, to determine if its position has changed from that of the previous setting. If it has, the program reads the voltages from the magnetic field sensor which are compared with the sensed voltages prior to the changing of the fan switch and determines the difference in direction signal information caused by a change in the fan speed selector switch. This is accomplished only when the vehicle speed is zero thereby eliminating the introduction of field changes due to vehicle direction change. As indicated by block 100, the offset signal is stored and associated with the current switch setting. The information is stored as indicated by block 102 for subsequent use as indicated by block 68 in the main program of FIG. 4 for correcting for the different fan speed settings. If the fan speed switch setting had not changed as indicated by the test of block 98, the program does not conduct any new calculations for different switch settings.

With this system therefore, the actual magnetic field change due to different fan speed switch settings is determined automatically for each vehicle by noting changes in the sensed magnetic field with fan speed switch changes when the vehicle speed is zero. The microcontroller then determines the exact offset needed for each switch setting which signals are employed for correcting the vehicle heading signals prior to display. This provides a more accurate and automatic correction since each vehicle may not have the exact field change due to slight variations in the wiring harness locations. Also, it allows the same compass circuitry to be placed into different car body types without the need to reprogram empirically determined offset signals. Although it is preferred to determine the correction information with the vehicle at rest, with proper damping and averaging of data, the automatic offset movement is predictable and taken into consideration. Thus, with a predetermined vehicle velocity, the dynamic field correction can also be determined.

Thus, the system of the present invention incorporates both normal compensation and variation correction and external magnetic field filtering as described in U.S. Pat. No. 4,953,305 and in the manner described in such patent as well as incorporating compensation for internal dynamic magnetic field interferences such as may be caused by the fan motor current changes. With such a system therefore, the car designer is freed from the constraints of positioning the magnetic field sensor in an area in the vehicle where internal magnetic field changes do not materially affect the compass sensor operation. It will become apparent to those skilled in the art that various modifications to the preferred embodiments of the invention as described herein can be made without departing from the spirit or scope of the invention as defined by the appended claims.

The embodiments of the invention in which an exclusive property or privilege is claimed are defined as follows:

1. A vehicle compass correction circuit for correcting for vehicle generated varying interfering magnetic fields comprising:

a vehicle accessory providing a varying magnetic field of an intensity sufficient to cause a compass display error;

a compass circuit including a magnetic field sensor and display for displaying direction indicating information detected by said magnetic field sensor; and a source of correction signals coupled to said compass circuit to provide correction signal information corresponding to vehicle generated magnetic field disturbances from said vehicle accessory, wherein said compass circuit responds to said correction signals to display a corrected heading corresponding to a heading unaffected by the vehicle accessory generated magnetic field disturbance.

2. The electrical circuit as defined in claim 1 wherein said source of correction signals comprises a detector circuit having an input terminal for coupling to a vehicle accessory providing internal magnetic field disturbances and an output terminal.

3. The electrical circuit as defined in claim 2 wherein said compass circuit includes a microcontroller having a data input terminal coupled to said output terminal of said detector for receiving correction signals therefrom.

4. A vehicle compass correction circuit for correcting for vehicle generated varying interfering magnetic fields comprising:

a compass circuit including a magnetic field sensor and display for displaying direction indicating information detected by said magnetic field sensor;

a source of correction signals coupled to said compass circuit to provide correction signal information corresponding to vehicle generated magnetic field disturbances, said source of correction signals comprises a detector circuit having an input terminal for coupling to a vehicle accessory providing internal magnetic field disturbances and an output terminal, wherein said compass circuit includes a microcontroller having a data input terminal coupled to said output terminal of said detector for receiving correction signals therefrom and responds to said correction signals to display a corrected heading corresponding to a heading unaffected by the vehicle generated magnetic field disturbance; and a fan motor for a vehicle HVAC system and an electrical control for varying the current through said fan motor and wherein said input terminal of said detector circuit is coupled to said fan motor.

5. The electrical circuit as defined in claim 4 wherein said detector circuit includes a voltage divider coupled from said input terminal to said output terminal for scaling the voltage applied to said input terminal.

6. The electrical circuit as defined in claim 5 wherein said detector circuit further includes a clamping circuit coupled to said output terminal for limiting the voltage applied to said microcontroller from said detector circuit.

7. A vehicle compass circuit for correcting for varying interfering magnetic fields generated by the use of vehicle accessories, said circuit comprising:

a vehicle accessory which generates a varying magnetic field which interferes with the compass display accuracy;

a magnetic field sensor for providing signals representative of the vehicle heading;

a microcontroller coupled to said sensor and to a display for displaying direction indicating information detected by said magnetic field sensor; and a source of correction signals coupled to said microcontroller to provide correction signal information corresponding to vehicle generated magnetic field disturbances caused by said accessory, wherein said microcontroller responds to said correction signals to display the correct heading.

8. The electrical circuit as defined in claim 7 wherein said source of correction signals comprises a detector circuit having an input terminal for coupling to said vehicle accessory which generates magnetic field disturbances.

9. A vehicle compass circuit for correcting for varying interfering magnetic fields generated by the use of vehicle accessories, said circuit comprising:

a magnetic field sensor for providing signals representative of the vehicle heading;

a microcontroller coupled to said sensor and to a display for displaying direction indicating information detected by said magnetic field sensor; and a source of correction signals coupled to said microcontroller to provide correction signal information corresponding to vehicle generated magnetic field disturbances, wherein said source of correction signals comprises a detector circuit having an input terminal for coupling to a vehicle accessory providing internal magnetic field disturbance, and wherein said microcontroller responds to said correction signals to display the correct heading, and wherein the vehicle accessory comprises a fan motor for a vehicle HVAC system and an electrical control for varying the current through said fan motor and wherein said input terminal of said detector circuit is coupled to said fan motor.

10. The electrical circuit as defined in claim 9 wherein said detector circuit includes an output terminal coupled to said microcontroller and a voltage divider coupled from said input terminal to said output terminal for scaling the voltage applied to said input terminal.

11. The electrical circuit as defined in claim 10 wherein said detector circuit further includes a clamping circuit coupled to said output terminal for limiting the voltage applied to said microcontroller from said detector circuit.

12. The electrical circuit as defined in claim 11 wherein said voltage divider includes an integrator circuit.

13. A vehicle compass including a circuit for correcting for different levels of local magnetic field disturbances caused by operation of electrical accessories in the vehicle, said compass comprising:

an electrical accessory which generates a varying magnetic field disturbance;

a magnetic field sensor for positioning in the vehicle in proximity to a source of varying magnetic field disturbance caused by said accessory;

a source of correction signals identifying the magnetic field disturbance;

a display for displaying the detected vehicle heading; and a microcontroller coupled to said sensor and to said source and display and responsive to said correction signals for accurately displaying the vehicle heading for different magnetic field disturbances.

14. A vehicle compass including a circuit for correcting for different levels of local magnetic field disturbances caused by operation of electrical accessories in the vehicle, said compass comprising:

a magnetic field sensor for positioning in the vehicle in proximity to a source of varying magnetic field disturbance;

a source of correction signals identifying the magnetic field disturbance;

a display for displaying the detected vehicle heading; and a microcontroller coupled to said sensor and to said source and display and responsive to said correction signals for accurately displaying the vehicle heading for different magnetic field disturbances, wherein the source of magnetic field disturbance is a multi-speed fan motor and wherein said source of correction signals comprises a detector circuit coupled to said fan motor.

15. The compass as defined in claim 14 wherein said detector circuit includes a voltage divider coupled to said fan motor for scaling the voltage applied to said microcontroller.

16. The compass as defined in claim 15 wherein said detector circuit further includes a clamping circuit for limiting the voltage applied to said microcontroller from said detector circuit.

17. The compass as defined in claim 16 wherein said voltage divider includes an integrator circuit.

18. A vehicle compass circuit for correcting for varying interfering magnetic fields generated by the use of vehicle accessories, said circuit comprising:

a vehicle accessory generating a varying magnetic field;

a magnetic field sensor for providing signals representative of the vehicle heading;

a circuit for providing signals representative of the operation of said accessory which causes dynamic field interference;

a speed sensor;

a microcontroller coupled to said magnetic field and speed sensors, to said circuit, and to a display for displaying direction indicating information detected by said magnetic field sensor; said microcontroller detecting a predetermined vehicle velocity and detecting changes in the sensed magnetic fields due to changes in the operational state of the vehicle accessory to provide correction signal information corresponding to vehicle generated magnetic field disturbances, wherein said microcontroller responds to said correction signals to provide signals to the display for displaying the corrected heading.

19. The electrical circuit as defined in claim 18 wherein said predetermined vehicle velocity is zero.

20. The electrical circuit as defined in claim 19 wherein said source of correction signals comprises a detector circuit having an input terminal for coupling to a vehicle accessory providing internal magnetic field disturbances.

21. A vehicle compass circuit for correcting for varying interfering magnetic fields generated by the use of vehicle accessories, said circuit comprising:

a magnetic field sensor for providing signals representative of the vehicle heading;

a circuit for providing signals representative of the operation of an accessory which causes dynamic field interference, said circuit comprising a detector circuit having an input terminal for coupling to a vehicle accessory providing internal magnetic field disturbances, wherein the vehicle accessory comprises a fan motor for a vehicle HVAC system and an electrical control for varying the current through said fan motor and wherein said input terminal of said detector circuit is coupled to said fan motor;

a speed sensor; and a microcontroller coupled to said magnetic field and speed sensors, to said circuit, and to a display for displaying direction indicating information detected by said magnetic field sensor; said microcontroller detecting zero vehicle velocity and detecting changes in the sensed magnetic fields due to changes in the operational state of said fan motor to provide correction signal information corresponding to vehicle generated magnetic field disturbances, wherein said microcontroller responds to said correction signals to provide signals to the display for displaying the corrected heading.

22. The electrical circuit as defined in claim 21 wherein said detector circuit includes an output terminal coupled to said microcontroller and a voltage divider coupled from said input terminal to said output terminal for scaling the voltage applied to said input terminal.

23. The electrical circuit as defined in claim 22 wherein said detector circuit further includes a clamping circuit coupled to said output terminal for limiting the voltage applied to said microcontroller from said detector circuit.

* * * * *